US009437242B1

(12) United States Patent
Banh et al.

(10) Patent No.: US 9,437,242 B1
(45) Date of Patent: Sep. 6, 2016

(54) DATA STORAGE DEVICE EMPLOYING DIFFERENT FREQUENCY PREAMBLES IN ADJACENT DATA TRACKS

(71) Applicant: Western Digital Technologies, Inc., Irvine, CA (US)

(72) Inventors: Thao Hieu Banh, Lake Forest, CA (US); Tom Sai-Cheung Chan, San Marino, CA (US); Chun Sei Tsai, Tustin, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/853,313

(22) Filed: Sep. 14, 2015

(51) Int. Cl.
*G11B 5/02* (2006.01)
*G11B 27/36* (2006.01)
*G11B 20/12* (2006.01)
*H02P 25/02* (2016.01)
*G11B 5/596* (2006.01)
*G11B 15/18* (2006.01)

(52) U.S. Cl.
CPC ....... *G11B 20/1217* (2013.01); *G11B 5/59627* (2013.01); *H02P 25/028* (2013.01); *G11B 2020/1229* (2013.01); *G11B 2020/1232* (2013.01); *G11B 2020/1238* (2013.01)

(58) Field of Classification Search
CPC ....... G11B 5/09; G11B 5/02; G11B 5/59694; G11B 5/59627; G11B 20/10009; G11B 27/36; G11B 2220/90; G11B 27/3027; G11B 5/59655
USPC ..... 360/31, 75, 30, 43, 61, 48, 51, 25, 72.1; 369/275.2, 275.3, 47.27
See application file for complete search history.

(56) References Cited

U.S. PATENT DOCUMENTS

| | | | |
|---|---|---|---|
| 6,018,789 A | 1/2000 | Sokolov et al. |
| 6,065,095 A | 5/2000 | Sokolov et al. |
| 6,078,452 A | 6/2000 | Kittilson et al. |
| 6,081,447 A | 6/2000 | Lofgren et al. |
| 6,092,149 A | 7/2000 | Hicken et al. |
| 6,092,150 A | 7/2000 | Sokolov et al. |
| 6,094,707 A | 7/2000 | Sokolov et al. |
| 6,105,104 A | 8/2000 | Guttmann et al. |
| 6,111,717 A | 8/2000 | Cloke et al. |
| 6,145,052 A | 11/2000 | Howe et al. |
| 6,175,893 B1 | 1/2001 | D'Souza et al. |
| 6,178,056 B1 | 1/2001 | Cloke et al. |
| 6,188,538 B1 | 2/2001 | Mills et al. |
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |

(Continued)

*Primary Examiner* — Nabil Hindi (57) ABSTRACT

A data storage device is disclosed comprising a disk comprising a plurality of data tracks each comprising a plurality of data sectors, and a head actuated over the disk. A first frequency preamble is written to a first data sector of a first data track and a second frequency preamble is written to a second data sector of a second data track, wherein the first frequency is different from the second frequency and the first data track is adjacent to the second data track.

24 Claims, 8 Drawing Sheets

(56) References Cited

U.S. PATENT DOCUMENTS

| | | |
|---|---|---|
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,643,084 B1 | 11/2003 | Andrew et al. |
| 6,647,481 B1 | 11/2003 | Luu et al. |
| 6,650,491 B2 | 11/2003 | Suzuki et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,920,005 B2 | 7/2005 | Yun |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,765 B2 | 2/2006 | Lum et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |

(56) References Cited

U.S. PATENT DOCUMENTS

| | | |
|---|---|---|
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,535 B2 | 8/2006 | Kim et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,494 B2 | 5/2007 | Wang et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |

(56) References Cited

U.S. PATENT DOCUMENTS

| | | |
|---|---|---|
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,466 B1 * | 2/2014 | McFadyen ............. G11B 5/607 360/31 |
| 8,654,467 B1 * | 2/2014 | Wong ............... G11B 20/10046 360/30 |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,769,593 B1 | 7/2014 | Schwartz et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 9,082,418 B2 * | 7/2015 | Ong ..................... G11B 5/012 |
| 2001/0028522 A1 | 10/2001 | Suzuki et al. |
| 2005/0052770 A1 | 3/2005 | Osafune |
| 2009/0113702 A1 | 5/2009 | Hogg |
| 2010/0039725 A1 * | 2/2010 | Maruyama ....... G11B 20/10009 360/31 |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2014/0201424 A1 | 7/2014 | Chen et al. |

\* cited by examiner

DATA STORAGE DEVICE EMPLOYING DIFFERENT FREQUENCY PREAMBLES IN ADJACENT DATA TRACKS

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
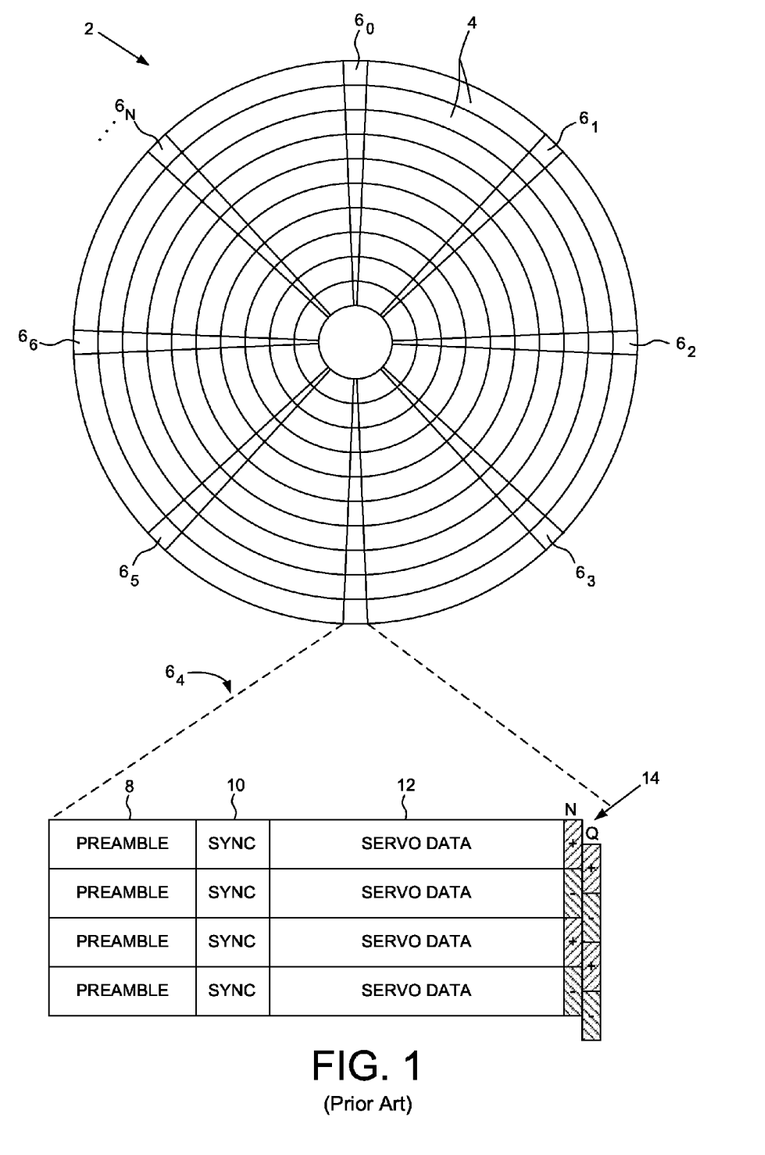
FIG. 1 shows a prior art disk format comprising a plurality of servo tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
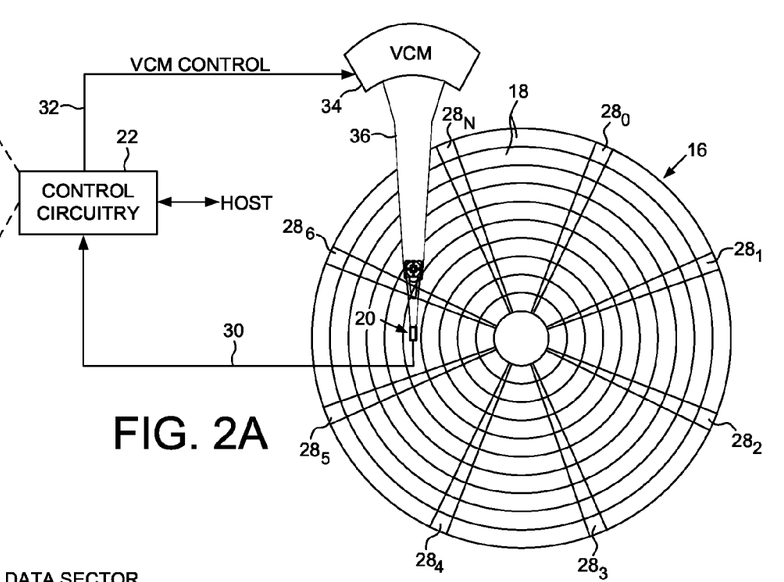
FIG. 2A shows a data storage device in the form of a disk drive according to an embodiment comprising a head actuated over a disk comprising a plurality of data tracks defined by servo tracks.
Figure 2B:
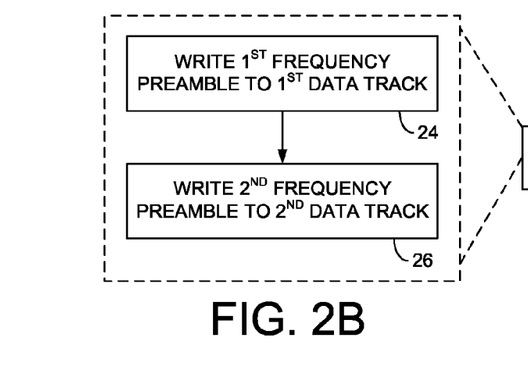
FIG. 2B is a flow diagram according to an embodiment wherein a first frequency preamble is written to a first data sector in a first data track, and a second frequency preamble is written to a second data sector of a second data track adjacent to the first data track.

FIG. 2A shows a data storage device in the form of a disk drive according to an embodiment comprising a disk 16 comprising a plurality of data tracks 18 each comprising a plurality of data sectors, and a head 20 actuated over the disk 16. The disk drive further comprises control circuitry 22 configured to execute the flow diagram of FIG. 2B, wherein a first frequency preamble is written to a first data sector of a first data track (block 24) and a second frequency preamble is written to a second data sector of a second data track (block 26), wherein the first frequency is different from the second frequency and the first data track is adjacent to the second data track.

In the embodiment of FIG. 2A, the disk 16 comprises a plurality of servo sectors $28_0$-$28_N$ that define a plurality of servo tracks, wherein the data tracks 18 are defined relative to the servo tracks at the same or different radial density. The control circuitry 22 processes a read signal 30 emanating from the head 20 to demodulate the servo sectors $28_0$-$28_N$ and generate a position error signal (PES) representing an error between the actual position of the head and a target position relative to a target track. A servo control system in the control circuitry 22 filters the PES using a suitable compensation filter to generate a control signal 32 applied to a voice coil motor (VCM) 34 which rotates an actuator arm 36 about a pivot in order to actuate the head 20 radially over the disk 16 in a direction that reduces the PES. The servo sectors $28_0$-$28_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

Figure 2C:
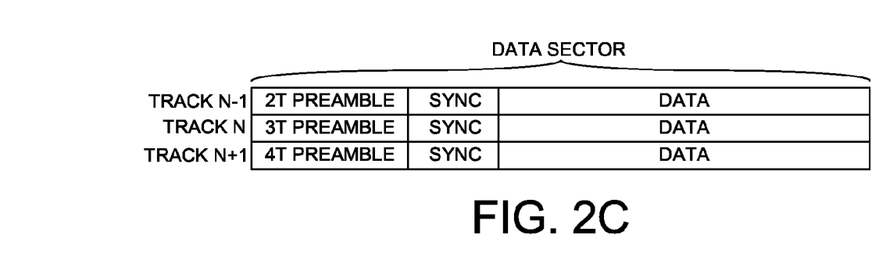
FIG. 2C illustrates an embodiment wherein a third frequency preamble is written to a third data sector in a third data track adjacent to the first data track.

In one embodiment, when writing to a data sector of a target data track a preamble is written to the data sector which may comprise a periodic signal having a predetermined frequency (e.g., a 2T preamble where "T" represents a bit cell period of the recorded data). When reading the data sector, the preamble may be processed, for example, to synchronize timing recovery and/or to adjust the gain of the read signal. The preamble may be written at any suitable location such as at the beginning of the data sector, and in some embodiments the preamble may be written at multiple locations such as a primary preamble written at the beginning of the data sector and a secondary preamble written between data segments and/or at the end of the data sector. In one embodiment illustrated in FIG. 2C, the preambles of adjacent data tracks may be written using different frequency periodic signals, wherein in the example of FIG. 2C the preambles of adjacent data tracks may be written as a 2T preamble, a 3T preamble, or a 4T preamble. Recording different frequency preambles in adjacent data tracks such as shown in FIG. 2C may be used advantageously for any suitable purpose, example embodiments of which are described below.

Figure 3A:
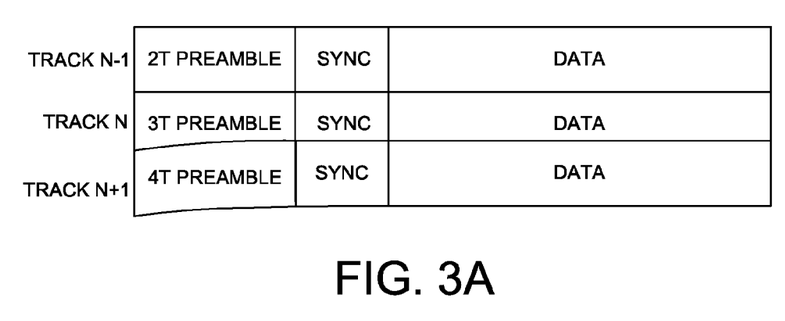
FIGS. 3A-3C illustrate an embodiment wherein the frequency components of the different frequency preambles are evaluated to generate a jog value used during a retry read operation.
Figure 3B:
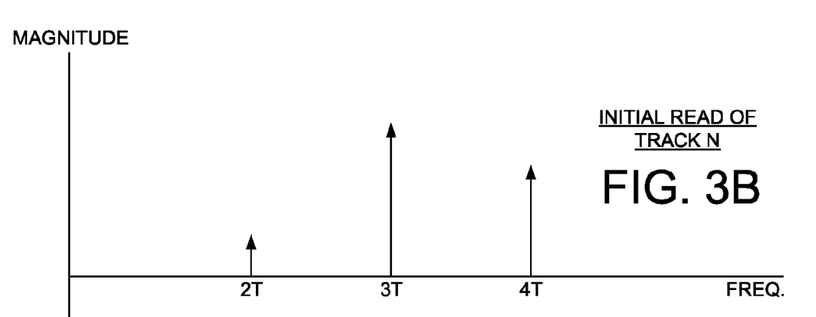
Figure 3C:
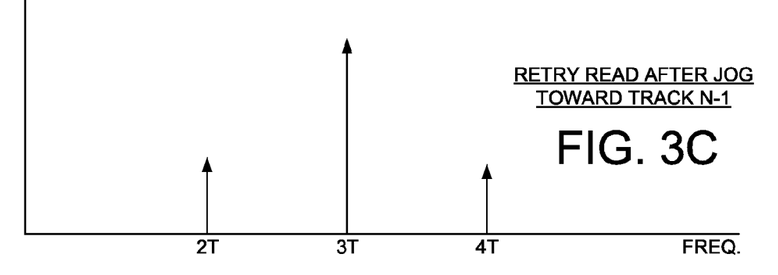
Figure 4:
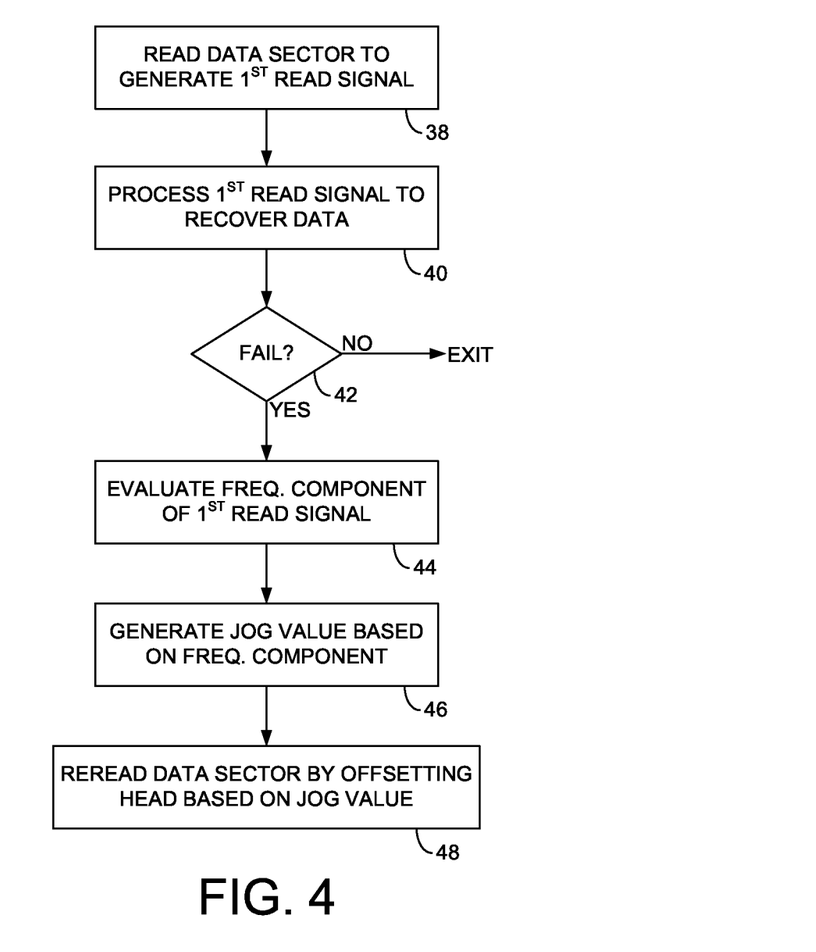
FIG. 4 is a flow diagram according to an embodiment wherein a retry read operation is executed by jogging the head away from an interfering data track as determined by the frequency components of the different frequency preambles.

FIG. 3A illustrates an embodiment wherein when writing to data track N+1 an off-track write may occur due, for example, to a vibration that causes the write element to deviate toward track N. Referring to the flow diagram of FIG. 4, when subsequently attempting to read a data sector from data track N (block 38) by processing the resulting read signal (block 40), the data sector may be unrecoverable due to the intertrack interference from track N+1. If the data sector is unrecoverable (block 42), a frequency component of the read signal is evaluated (block 44) in order to generate a jog value (block 46). A retry read of the data sector is then executed while offsetting the head by the jog value (block 48). FIG. 3B illustrates the frequency components of the read signal when initially reading the 3T preamble of the data sector in data track N. Since the magnitude of the 4T frequency component is relatively large due to the intertrack interference from data track N+1, a jog value is generated that jogs the head toward data track N−1 during the retry read of data track N. As illustrated in FIG. 3C, during the retry read the resulting 4T frequency component is reduced as is the intertrack interference from data track N+1, thereby enabling the recovery of the data sector in data track N. The jog value may be generated in any suitable manner, such as based on the magnitude of the adjacent track preamble frequencies and/or based on the magnitude of the adjacent track preamble frequencies relative to the magnitude of the target track preamble frequency.

In one embodiment, generating the sign and magnitude of the jog value based on the magnitude of the preamble frequencies reduces the time required to recover a data sector as compared to the prior art technique of selecting an arbitrary sign and incrementally increasing the magnitude of the jog value until the data sector is recovered. That is, in one embodiment the magnitude of the preamble frequencies helps determine the correct sign (radial direction) of the jog value as well as an accurate estimate of the jog magnitude that will result in a successful retry read rather than arbitrarily scanning through a number of jog magnitudes in both radial directions until the data sector is recovered.

Figure 5:
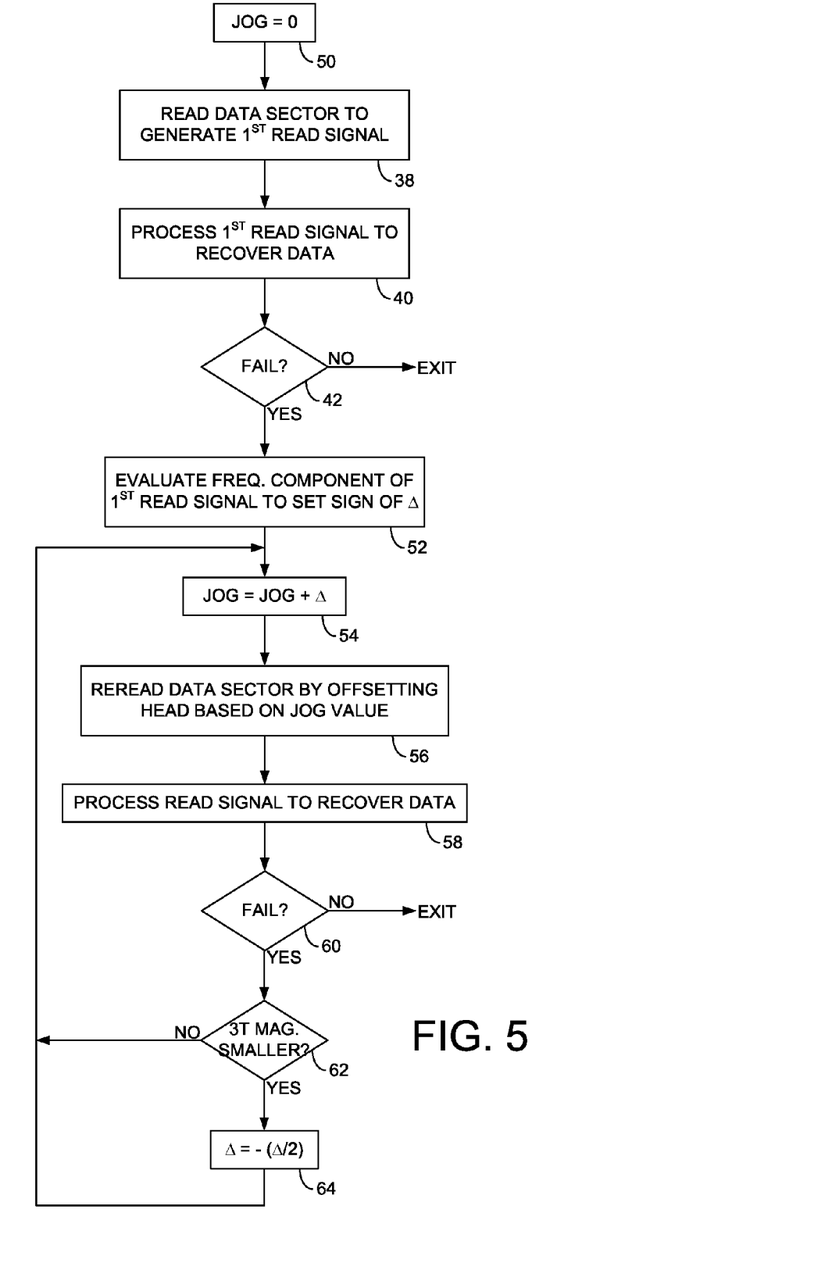
FIG. 5 is a flow diagram according to an embodiment wherein the jog value used during retry operations may be adjusted incrementally based on the frequency components of the different frequency preambles.

FIG. 5 is a flow diagram according to an embodiment wherein the jog value is initialized to zero (block 50). When a data sector is unrecoverable at block 42, a frequency component of the read signal is evaluated to select a sign for a jog delta (block 52). The jog value is then adjusted by the jog delta (block 54) and the data sector reread while offsetting the head radially away from the target track based on the jog value (block 56). The resulting read signal is processed to recover the data sector (block 58), and if the retry read fails (block 60), the process is repeated after incrementally increasing the magnitude of the jog value at block 54. If the data sector is unrecoverable at block 60 and the magnitude of the preamble frequency (in this example the 3T frequency) of the target data sector begins to decrease at block 62, it indicates that the head has been offset too far away from the target data track. Accordingly, the polarity of the jog delta is reversed and the magnitude of the jog delta is halved (block 64) so that the head is incrementally stepped back toward the target data track during subsequent retry reads. Although not shown, the flow diagram of FIG. 5 may terminate after a predetermined number of iterations if the data sector in the target data track cannot be recovered, in which case the host may be notified of a fatal error or other heroic error recovery procedures executed.

Figure 6:
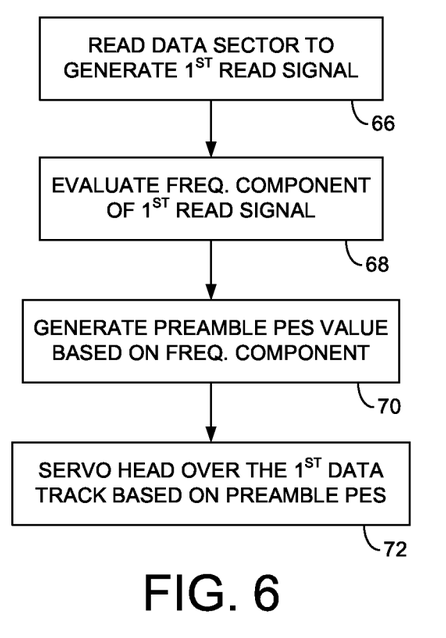
FIG. 6 is a flow diagram according to an embodiment wherein the frequency components of the different frequency preambles may be used to generate a preamble position error signal (PES) used to servo the head over the disk during a read operation.

FIG. 6 is a flow diagram that illustrates another use for writing different frequency preambles to adjacent data tracks according to another embodiment. In this embodiment, when reading the data sector from data track N (block 66) as shown in FIG. 3A, a frequency component of the read signal is evaluated (block 68) in order to generate a preamble position error signal (PES) (block 70). The head is then servoed over data track N based on the preamble PES (block 72), for example, in order to read one or more data sectors from data track N. This embodiment may help the head track the actual centerline of the data track as compared to the centerline of the data track defined by the servo sectors $28_0$-$28_N$. For example, if a data track is written off-track due to a vibration during a write operation, the preamble PES may improve the ability to recover data sectors from the data track during read operations. The preamble PES may be generated in any suitable manner, such as based on the magnitude of the target data track preamble frequency in the read signal, and/or based on the relative magnitudes of the adjacent track preamble frequencies in the read signal. Referring again to the example of FIG. 3A, when attempting to read a data sector from track N the preamble PES may be generated based on a difference between the measured magnitudes of the preamble frequencies and target magnitudes, wherein the relative magnitude of the 4T preamble frequency (from data track N+1) and the 2T preamble frequency (from data track N−1) may determine the sign of the preamble PES. In another embodiment, the preamble PES may be incrementally adjusted at each data sector so as to maximize the magnitude of the target data track preamble frequency (e.g., the 3T frequency when reading data from data track N).

Figure 7:
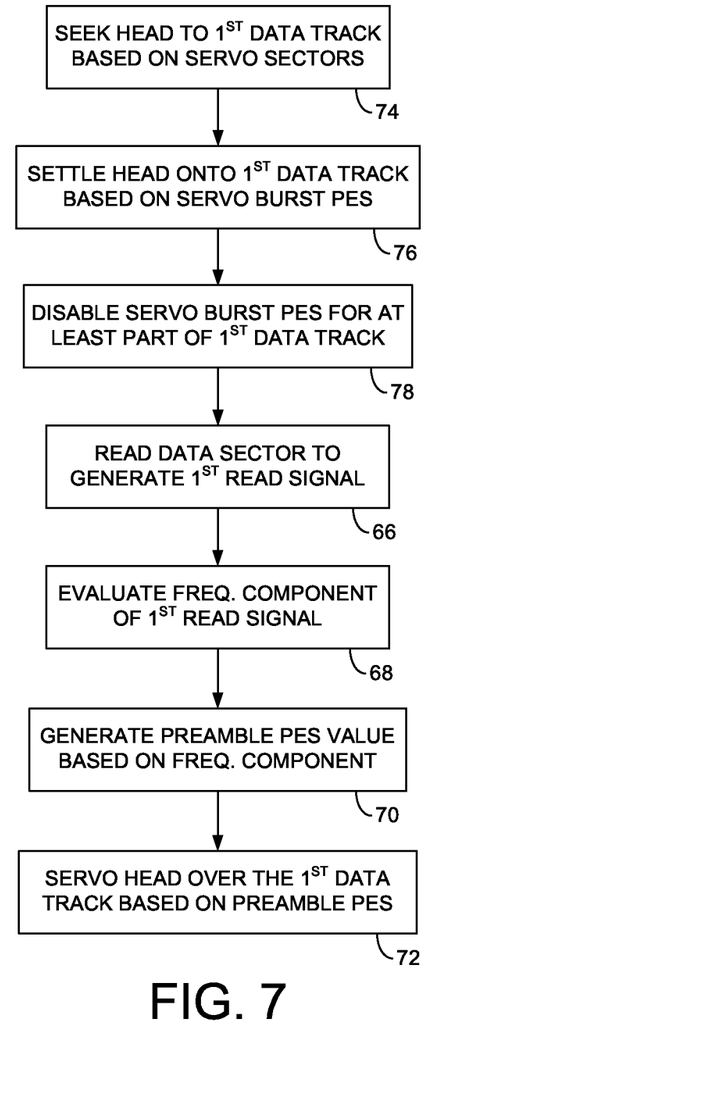
FIG. 7 is a flow diagram according to an embodiment wherein the servo burst PES may be disabled after settling onto the target data track and the preamble PES used to servo the head while tracking the target data track during a read operation.

FIG. 7 is a flow diagram that extends on the flow diagram of FIG. 6, wherein when executing a read operation the control circuitry seeks the head to the target data track based on the servo sectors (block 74) and then settles the head onto the target data track based on the servo burst PES (block 76). Once the head has settled onto the target data track, the servo burst PES may be disabled for at least part of the data track (block 78) so that the head may be servoed over the target data track based on the preamble PES. That is, in one embodiment the preamble PES may provide a more accurate tracking of the target data track during at least part of a read operation, particularly if at least part of the target data track was written off-track due, for example, to a vibration during the write operation.

The preamble PES may be used to servo the head over the disk during an initial read of a data track, and/or it may be used during a retry read as part of an error recovery procedure. In some embodiments, the preamble PES and the servo burst PES may be weighted differently and then combined to generate a different servo system PES during each retry read. That is, there may be a particular weighting of the preamble PES and the servo burst PES that may enable the successful recovery of a data sector.

Figure 8:
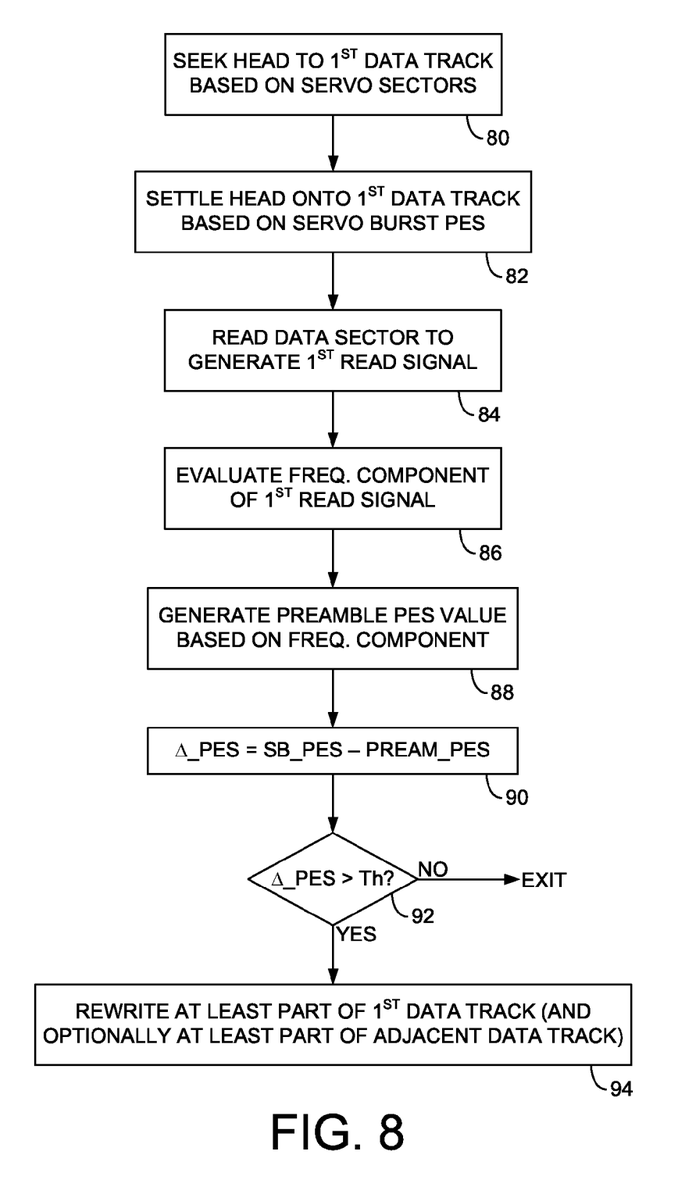
FIG. 8 is a flow diagram according to an embodiment wherein when a difference between the preamble PES and the servo burst PES exceeds a threshold during a read operation, the target data track is rewritten to compensate for an off-track write due, for example, to a vibration during the write operation.

FIG. 8 is a flow diagram that illustrates another use for writing different frequency preambles to adjacent data tracks according to another embodiment. When executing a read operation the control circuitry seeks the head to the target data track based on the servo sectors (block 80) and then settles the head onto the target data track based on the servo burst PES (block 82). While tracking the target data track based on the servo burst PES, a data sector is read to generate a read signal (block 84) and a frequency component of the read signal is evaluated (block 86) to generate a preamble PES (block 88) as described above. A delta between the servo burst PES and the preamble PES is generated (block 90), and when the delta exceeds a threshold (block 92), at least part of the target data track is rewritten and optionally at least part of at least one of the data tracks adjacent to the target data track is rewritten (block 94). In this embodiment, the preamble PES operates as a metric for indicating when a data track is written off-track due, for example, to a vibration during a write operation. That is, the preamble PES may indicate when a written data track deviates from the target data track as defined by the servo sectors, and therefore may be used to trigger a rewrite in order to re-align the data track. Prior to rewriting a misaligned data track, the adjacent data tracks may also be read and then rewritten together with the target data track so that the rewrite does not corrupt the previously written adjacent data tracks.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk comprising a plurality of data tracks each comprising a plurality of data sectors;
   a head actuated over the disk; and
   control circuitry configured to write a first frequency preamble to a first data sector of a first data track and write a second frequency preamble to a second data sector of a second data track, wherein:
   the first frequency is different from the second frequency; and
   the first data track is adjacent to the second data track,
   wherein the control circuitry is further configured to:
   first read the first data sector to generate a first read signal;
   process the first read signal to recover data from the first data sector; and
   when the first read fails, execute a retry operation by at least:
      evaluating a frequency component of the first read signal corresponding to the first frequency preamble of the first data sector;
      generating a jog value based on the frequency component of the first read signal; and
      second reading the first data sector by offsetting the head away from the first data track based on the jog value.

2. The data storage device as recited in claim 1, wherein the control circuitry is further configured to write a third frequency preamble to a third data sector of a third data track, wherein:
   the third frequency is different from the first and second frequency; and
   the third data track is adjacent to the first data track.

3. The data storage device as recited in claim 1, wherein the control circuitry is further configured to generate the jog value based on a magnitude of the first frequency in the frequency component and a magnitude of the second frequency in the frequency component.

4. The data storage device as recited in claim 1, wherein the control circuitry is further configured to execute the retry operation by further:
   adjusting the jog value based on a frequency component of a second read signal generated when reading the first frequency preamble during the second reading of the first data sector; and
   third reading the first data sector based on the adjusted jog value.

5. The data storage device as recited in claim 4, wherein the control circuitry is further configured to adjust the jog value in a direction that increases a magnitude of the first frequency in the frequency component when reading the first frequency preamble of the first data sector.

6. The data storage device as recited in claim 1, wherein the control circuitry is further configured to execute a read operation of the first data track by at least:
   reading the first data sector to generate a first read signal;
   evaluating a frequency component of the first read signal corresponding to the first frequency preamble of the first data sector;
   generating a preamble position error signal (PES) based on the frequency component; and
   servoing the head over the first data track based on the preamble PES.

7. The data storage device as recited in claim 6, wherein the control circuitry is further configured to read a third data sector in the first data track while servoing the head over the first data track based on the preamble PES.

8. The data storage device as recited in claim 6, wherein the data tracks are defined by a plurality of servo sectors each comprising servo bursts, and the control circuitry is further configured to execute the read operation of the first data track by at least:
   seeking the head to the first data track based on the servo sectors;
   settling the head onto the first data track based on a servo burst PES generated by reading the servo bursts in the servo sectors; and
   disabling the servo burst PES while reading at least part of the first data track.

9. The data storage device as recited in claim 1, wherein the data tracks are defined by a plurality of servo sectors each comprising servo bursts, and the control circuitry is further configured to execute a read operation of the first data track by at least:
   reading the servo bursts of the servo sectors that define the first data track to generate a servo burst position error signal (PES);
   reading the first data sector to generate a first read signal;
   evaluating a frequency component of the first read signal corresponding to the first frequency preamble of the first data sector;
   generating a preamble PES based on the frequency component; and
   rewriting at least part of the first data track based on a difference between the servo burst PES and the preamble PES.

10. A method of operating a data storage device, the method comprising:
    writing a first frequency preamble to a first data sector of a first data track on a disk and writing a second frequency preamble to a second data sector of a second data track on the disk, wherein:
        the first frequency is different from the second frequency; and
        the first data track is adjacent to the second data track;
    first reading the first data sector to generate a first read signal;
    processing the first read signal to recover data from the first data sector; and
    when the first read fails, executing a retry operation by at least:
        evaluating a frequency component of the first read signal corresponding to the first frequency preamble of the first data sector;
        generating a jog value based on the frequency component of the first read signal; and
        second reading the first data sector by offsetting a head away from the first data track based on the jog value.

11. The method as recited in claim 10, further comprising writing a third frequency preamble to a third data sector of a third data track on the disk, wherein:
    the third frequency is different from the first and second frequency; and
    the third data track is adjacent to the first data track.

12. The method as recited in claim 10, further comprising generating the jog value based on a magnitude of the first frequency in the frequency component and a magnitude of the second frequency in the frequency component.

13. The method as recited in claim 10, wherein executing the retry operation further comprises:
    adjusting the jog value based on a frequency component of a second read signal generated when reading the first frequency preamble during the second reading of the first data sector; and
    third reading the first data sector based on the adjusted jog value.

14. The method as recited in claim 13, further comprising adjusting the jog value in a direction that increases a magnitude of the first frequency in the frequency component when reading the first frequency preamble of the first data sector.

15. The method as recited in claim 10, further comprising executing a read operation of the first data track by at least:
    reading the first data sector to generate a first read signal;
    evaluating a frequency component of the first read signal corresponding to the first frequency preamble of the first data sector;
    generating a preamble position error signal (PES) based on the frequency component; and
    servoing a head over the first data track based on the preamble PES.

16. The method as recited in claim 15, further comprising reading a third data sector in the first data track while servoing the head over the first data track based on the preamble PES.

17. The method as recited in claim 15, wherein the data tracks are defined by a plurality of servo sectors each comprising servo bursts, and the method further comprises executing the read operation of the first data track by at least:
    seeking the head to the first data track based on the servo sectors;
    settling the head onto the first data track based on a servo burst PES generated by reading the servo bursts in the servo sectors; and
    disabling the servo burst PES while reading at least part of the first data track.

18. The method as recited in claim 10, wherein the data tracks are defined by a plurality of servo sectors each comprising servo bursts, and the method further comprises executing a read operation of the first data track by at least:
    reading the servo bursts of the servo sectors that define the first data track to generate a servo burst position error signal (PES);
    reading the first data sector to generate a first read signal;
    evaluating a frequency component of the first read signal corresponding to the first frequency preamble of the first data sector;
    generating a preamble PES based on the frequency component; and rewriting at least part of the first data track based on a difference between the servo burst PES and the preamble PES by a threshold.

19. A data storage device comprising:
a disk comprising a plurality of data tracks each comprising a plurality of data sectors, wherein the data tracks are defined by a plurality of servo sectors each comprising servo bursts;
a head actuated over the disk; and
control circuitry configured to:
write a first frequency preamble to a first data sector of a first data track and write a second frequency preamble to a second data sector of a second data track, wherein:
the first frequency is different from the second frequency; and
the first data track is adjacent to the second data track;
execute a read operation of the first data track by at least:
seeking the head to the first data track based on the servo sectors;
settling the head onto the first data track based on a servo burst PES generated by reading the servo bursts in the servo sectors;
reading the first data sector to generate a first read signal;
evaluating a frequency component of the first read signal corresponding to the first frequency preamble of the first data sector;
generating a preamble position error signal (PES) based on the frequency component;
servoing the head over the first data track based on the preamble PES; and
disabling the servo burst PES while reading at least part of the first data track.

20. A data storage device comprising:
a disk comprising a plurality of data tracks each comprising a plurality of data sectors, wherein the data tracks are defined by a plurality of servo sectors each comprising servo bursts;
a head actuated over the disk; and
control circuitry configured to write a first frequency preamble to a first data sector of a first data track and write a second frequency preamble to a second data sector of a second data track, wherein:
the first frequency is different from the second frequency; and
the first data track is adjacent to the second data track;
execute a read operation of the first data track by at least:
reading the servo bursts of the servo sectors that define the first data track to generate a servo burst position error signal (PES);
reading the first data sector to generate a first read signal;
evaluating a frequency component of the first read signal corresponding to the first frequency preamble of the first data sector;
generating a preamble PES based on the frequency component; and
rewriting at least part of the first data track based on a difference between the servo burst PES and the preamble PES.

21. The data storage device as recited in claim 20, wherein the control circuitry is further configured to rewrite at least part of the second data track based on the difference between the servo burst PES and the preamble PES by a threshold.

22. A method of operating a data storage device, the method comprising:
writing a first frequency preamble to a first data sector of a first data track on a disk and writing a second frequency preamble to a second data sector of a second data track on the disk, wherein:
the first frequency is different from the second frequency; and
the first data track is adjacent to the second data track;
executing a read operation of the first data track by at least:
seeking a head to the first data track based on servo sectors that define the first data track;
settling the head onto the first data track based on a servo burst PES generated by reading servo bursts in the servo sectors;
reading the first data sector to generate a first read signal;
evaluating a frequency component of the first read signal corresponding to the first frequency preamble of the first data sector;
generating a preamble position error signal (PES) based on the frequency component;
servoing the head over the first data track based on the preamble PES; and
disabling the servo burst PES while reading at least part of the first data track.

23. A method of operating a data storage device, the method comprising:
writing a first frequency preamble to a first data sector of a first data track on a disk and writing a second frequency preamble to a second data sector of a second data track on the disk, wherein:
the first frequency is different from the second frequency; and
the first data track is adjacent to the second data track;
executing a read operation of the first data track by at least:
reading the servo bursts of the servo sectors that define the first data track to generate a servo burst position error signal (PES);
reading the first data sector to generate a first read signal;
evaluating a frequency component of the first read signal corresponding to the first frequency preamble of the first data sector;
generating a preamble PES based on the frequency component; and
rewriting at least part of the first data track based on a difference between the servo burst PES and the preamble PES.

24. The method as recited in claim 23, further comprising rewriting at least part of the second data track based on the difference between the servo burst PES and the preamble PES.

* * * * *